(No Model.) 2 Sheets—Sheet 1.
G. P. PRENTIS
ROTARY HARROW.
No. 413,630. Patented Oct. 22, 1889.
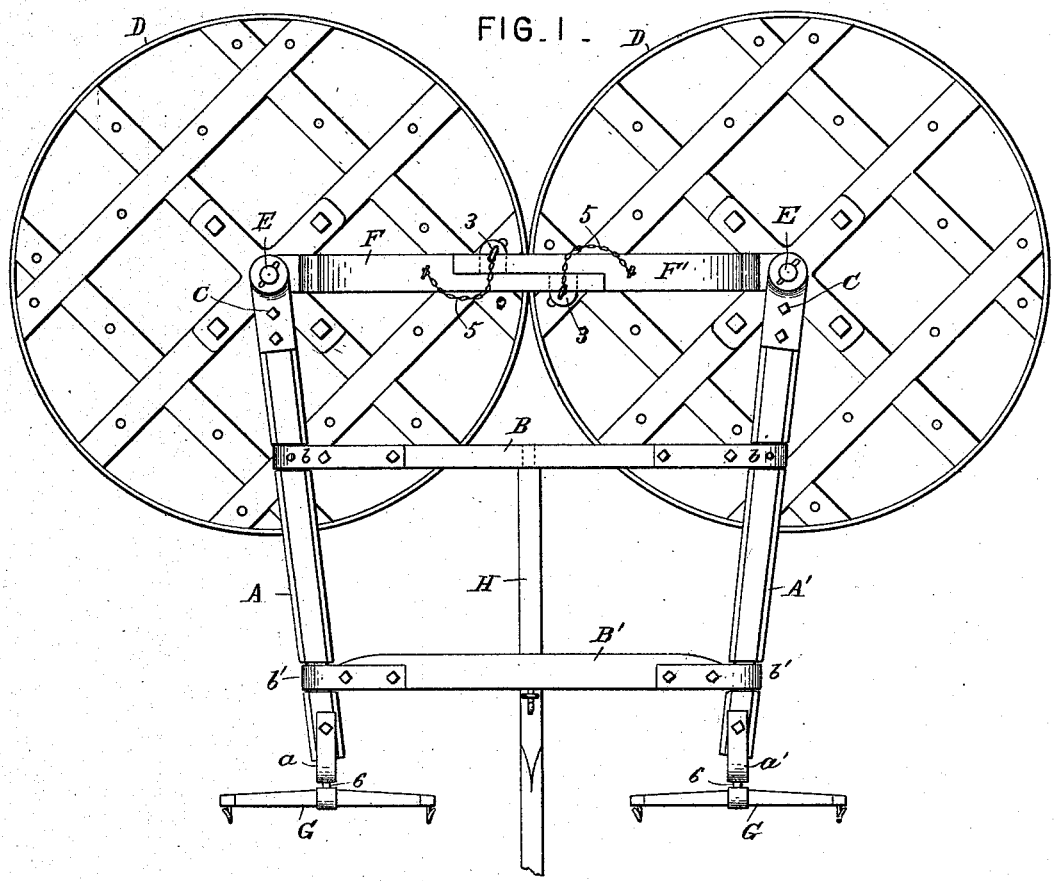
FIG. I.
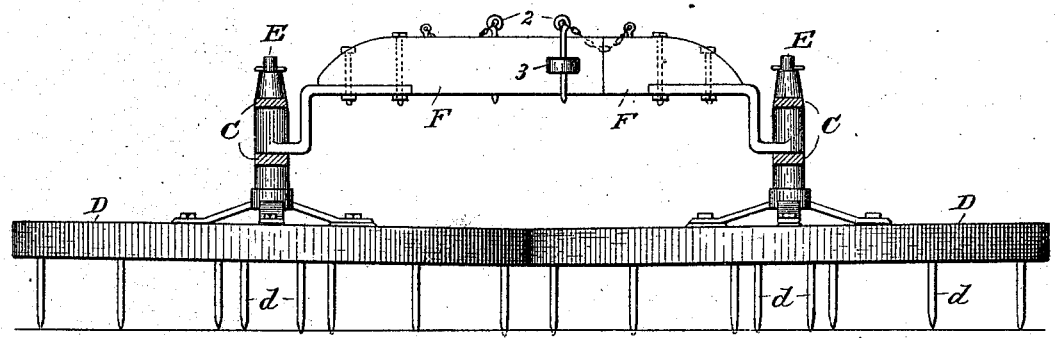
FIG. II.
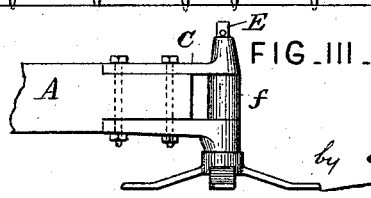
FIG. III.
Attest:
Geo. T. Smallwood.
C. Arthur.
Inventor:
George P. Prentis
by Knight Bros.
Attys
N. PETERS, Photo-Lithographer, Washington, D. C.

(No Model.) 2 Sheets—Sheet 2.
G. P. PRENTIS.
ROTARY HARROW.
No. 413,630. Patented Oct. 22, 1889.
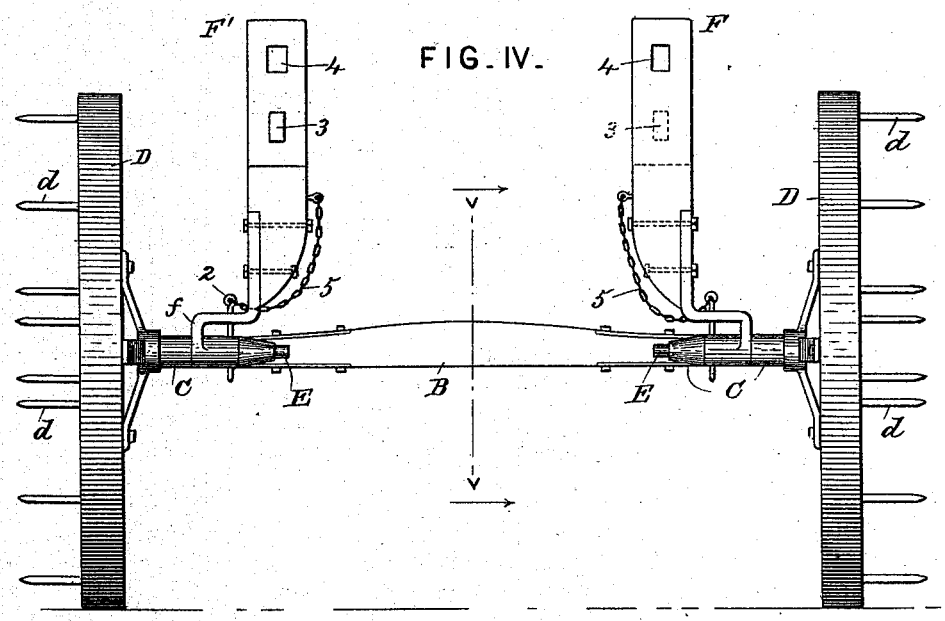
FIG. IV.
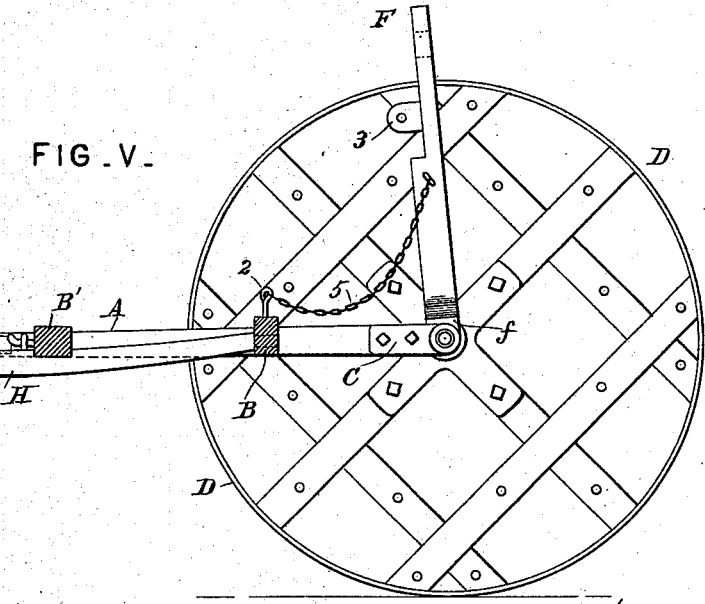
FIG. V.
Attest:
Geo. T. Smallwood.
E. Arthur.
Inventor
George P. Prentis.
by Knight Bros attys

UNITED STATES PATENT OFFICE.

GEORGE P. PRENTIS, OF LEWISPORT, KENTUCKY, ASSIGNOR OF ONE-THIRD TO THOMAS J. PELL, OF SAME PLACE.

ROTARY HARROW.

SPECIFICATION forming part of Letters Patent No. 413,630, dated October 22, 1889.

Application filed June 17, 1889. Serial No. 314,528. (No model.)

*To all whom it may concern:*

Be it known that I, GEORGE P. PRENTIS, a citizen of the United States, residing at Lewisport, in the county of Hancock and State of Kentucky, have invented certain new and useful Improvements in Convertible Rotary Harrows; and I do hereby declare the following specification, taken in connection with the accompanying drawings, which form a part thereof, to be a full, clear, and exact description of my improvement, such as will enable those skilled in the art to which it appertains to make and use the same.

My invention has relation to that class of rotary harrows which are convertible from harrows to carts, or vice versa; and it consists in improvements in means for more easily and effectually bringing about this conversion.

In most convertible rotary harrows heretofore known I have found the great objection to be a weakness at the points of most strain, caused by having pivotal or similar connections between the axial pins or supports and the frame of the harrow at or near the inner ends of the axial pins.

It is the object of my present invention to obviate this great objection and form a substantial, cheap, and simple harrow with all the advantages of the more expensive and intricate forms; and to this end my invention consists, essentially, of the two draft-bars having rigidly secured to their rear ends the bearings for the axles, which are rigidly secured to the wheels, and the two cross-bars having eyes or loops at both ends through which the draft-bars pass. This allows the draw-bars to turn and place the wheels in horizontal or vertical position.

The several details of construction which enable me to carry out my invention will first be described with reference to the accompanying drawings, and the novel features then more particularly pointed out in the claims.

In said drawings, Figure I is a plan view of my improved harrow in position for harrowing. Fig. II is a front end view of the same, the draft-bars being shown in section. Fig. III is a detail view. Fig. IV is a rear view of the implement in position for transportation; and Fig. V is a sectional view taken on the line V V, Fig. IV.

A A' are the draft-bars, and B B' the cross-bars, of the harrow-frame. These cross-bars B B' have at their ends metal bands, forming eyes or loops $b\ b'$, respectively, which engage in annular grooves on the draft-bars and hold them in position from lateral or longitudinal movement, but allow them free rotation. The metal bands $b$ on the ends of the cross-bars B have perforations 1 to correspond with perforations in the draft-bars A A', through which pins 2 pass to hold the draft-bars from rotary movement. On the rear ends of the draft-bars U-shaped sockets or bearings C are rigidly secured, in which bearings the axial pins E of the wheels D rest and rotate. These axial pins E are rigidly secured to the centers of the wheels D, as clearly shown in Figs. I, III, and IV. These wheels or circular frames D have tines $d$ set in them in the usual manner and rotate on vertical axes as the harrow is drawn along the ground.

F F' are detachable pieces, forming a third cross-bar for holding the draft-bars against rotary movement while the implement is being used as a harrow. The pieces F F' have metal bearings $f\ f'$, respectively, which fit in the U of the bearings C, and are held in place by and bear on the axial pins E. The inner ends of the pieces F F' are shaped so as to form a mortise-joint, having lugs or projections 3, which fit into sockets 4 and make the cross-bar more secure.

The metallic bearings $f\ f'$ are so formed and attached to the pieces F F' that when the mortise-joint is formed and secured by the pins 2 it will cause the axial pins E to incline inward, and consequently the inner sides of the harrow-wheels to dish down and have more friction than the outer sides. This, it is obvious, will cause the wheels to rotate as the harrow is drawn over the ground and much more effectually do the work of harrowing than if the tines were all on the same level. This feature is clearly shown in Fig. II.

The pins 2 are secured to the pieces F F' by chains 5, which are attached to eyes on the ends of the pins, and are adapted to fit either in perforations in lugs 3 (to keep the parts F F' together) or in perforations 1 in metal loops *b*.

*a a'* are metal bands or loops attached to the front ends of the draft-bars A A'. To these bands *a a'* the singletrees G are attached by means of pins 6 passing through perforations in said bands and attached to the singletrees. The inner ends of the pins 6 are provided with heads to retain them in said perforations. By so connecting the singletrees to the draft-bars by single pins it is obvious that they will always be in the proper horizontal position, no matter in what position the draft-bars are.

A shaft H is detachably attached to the cross-bars B B', as shown clearly in Figs. I and V.

As a modified form for connecting the wheels to the draft-bars, the axles may be rigidly secured to the draft-bars and the wheels fixed on the axles in the usual manner.

From my construction it is obvious that the weak points at the parts of most strain are done away with and the convertible harrow made as substantial as the common rotary harrow.

Having thus described my invention, the following is what I claim as new therein and desire to secure by Letters Patent:

1. In a convertible rotary harrow, the combination of the cross-pieces having eyes or loops on their ends with rotatory draft-bars passing through said loops, and means for securing said bars against rotation, as set forth.

2. In a convertible rotary harrow, the combination of cross-bars B B', having loops *b b'* at their ends, rotatory draft-bars A A', passing through said loops and having bearings C rigidly attached to their rear ends, circular frames or wheels D, having axial pins E adapted to fit in said bearings C, and detachable cross-bar F F' for retaining the parts in position, as set forth.

3. In a convertible harrow, the combination of the cross-bars B B', rotatory draft-bars A A', wheels D, and detachable cross-bar F F', with pins 2, adapted to engage with the perforations in lugs 3 or with perforations in loops *b*, substantially as shown and described.

4. In a convertible rotary harrow, the combination of the cross-bars B B', rotatory draft-bars A A', and wheels D, rotating on axles E, with the singletrees G, attached to band *a a'* by means of single pin 6, whereby the singletree is always horizontal, substantially as shown and described.

GEORGE P. PRENTIS.

Witnesses:
ALBERT C. HOWE,
JOHN HERZOG.